US011908310B2

(12) United States Patent
Taipale et al.

(10) Patent No.: US 11,908,310 B2
(45) Date of Patent: Feb. 20, 2024

(54) METHODS AND SYSTEMS FOR DETECTING AND MANAGING UNEXPECTED SPECTRAL CONTENT IN AN AMPLIFIER SYSTEM

(71) Applicant: Cirrus Logic International Semiconductor Ltd., Edinburgh (GB)

(72) Inventors: Dana J. Taipale, Austin, TX (US); Jon D. Hendrix, Wimberley, TX (US); Emmanuel A. Marchais, Dripping Springs, TX (US)

(73) Assignee: Cirrus Logic Inc., Austin, TX (US)

( * ) Notice: Subject to any disclaimer, the term of this patent is extended or adjusted under 35 U.S.C. 154(b) by 116 days.

(21) Appl. No.: 17/549,399

(22) Filed: Dec. 13, 2021

(65) Prior Publication Data

US 2022/0406152 A1 Dec. 22, 2022

Related U.S. Application Data

(60) Provisional application No. 63/213,357, filed on Jun. 22, 2021.

(51) Int. Cl.
*G08B 6/00* (2006.01)

(52) U.S. Cl.
CPC .................................... *G08B 6/00* (2013.01)

(58) Field of Classification Search
CPC ........................................ G08B 6/00
USPC ........................................ 340/407.1
See application file for complete search history.

(56) References Cited

U.S. PATENT DOCUMENTS 3,686,927 A 8/1972 Scharton
4,902,136 A 2/1990 Mueller et al.
5,374,896 A 12/1994 Sato et al.
5,684,722 A 11/1997 Thorner et al.
5,748,578 A 5/1998 Schell
5,857,986 A 1/1999 Moriyasu
6,050,393 A 4/2000 Murai et al.
6,278,790 B1 8/2001 Davis et al.
(Continued)

FOREIGN PATENT DOCUMENTS

AU 2002347829 4/2003
CN 103165328 A 6/2013
(Continued)

OTHER PUBLICATIONS

Examination Report under Section 18(3), UKIPO, Application No. GB2112207.2, dated Nov. 7, 2022.
(Continued)

*Primary Examiner* — Jack K Wang
(74) *Attorney, Agent, or Firm* — Jackson Walker L.L.P.

(57) ABSTRACT

A method may include receiving, by a transducer driving system, a first signal for driving an amplifier that drives an electromagnetic load and receiving, by the transducer driving system, a second signal driven by the amplifier in order to control a feedback loop of the transducer driving system. The method may also include detecting unexpected spectral content in the second signal, declaring an indicator event based on the detected unexpected spectral content, determining whether the indicator event occurs in an undesired pattern, and in response to the indicator event occurring in the undesired pattern, modifying a behavior of the transducer driving system.

24 Claims, 9 Drawing Sheets

(56) References Cited

U.S. PATENT DOCUMENTS 6,294,891 B1 9/2001 McConnell et al.
6,332,029 B1 12/2001 Azima et al.
6,388,520 B2 5/2002 Wada et al.
6,567,478 B2 5/2003 Oishi et al.
6,580,796 B1 6/2003 Kuroki
6,683,437 B2 1/2004 Tierling
6,703,550 B2 3/2004 Chu
6,762,745 B1 7/2004 Braun et al.
6,768,779 B1 7/2004 Nielsen
6,784,740 B1 8/2004 Tabatabaei
6,816,833 B1 11/2004 Iwamoto et al.
6,906,697 B2 6/2005 Rosenberg
6,995,747 B2 2/2006 Casebolt et al.
7,042,286 B2 5/2006 Meade et al.
7,154,470 B2 12/2006 Tierling
7,277,678 B2 10/2007 Rozenblit et al.
7,333,604 B2 2/2008 Zernovizky et al.
7,392,066 B2 6/2008 Haparnas
7,456,688 B2 11/2008 Okazaki et al.
7,623,114 B2 11/2009 Rank
7,639,232 B2 12/2009 Grant et al.
7,777,566 B1 8/2010 Drogi et al.
7,791,588 B2 9/2010 Tierling et al.
7,825,838 B1 11/2010 Srinivas et al.
7,979,146 B2 7/2011 Ullrich et al.
8,068,025 B2 11/2011 Devenyi et al.
8,098,234 B2 1/2012 Lacroix et al.
8,102,364 B2 1/2012 Tierling
8,325,144 B1 12/2012 Tierling et al.
8,427,286 B2 4/2013 Grant et al.
8,441,444 B2 5/2013 Moore et al.
8,466,778 B2 6/2013 Wang et al.
8,480,240 B2 7/2013 Kashiyama
8,572,293 B2 10/2013 Cruz-Hernandez et al.
8,572,296 B2 10/2013 Shasha et al.
8,593,269 B2 11/2013 Grant et al.
8,648,659 B2 2/2014 Oh et al.
8,648,829 B2 2/2014 Shahoian et al.
8,659,208 B1 2/2014 Rose et al.
8,754,757 B1 6/2014 Ullrich et al.
8,754,758 B1 6/2014 Ullrich et al.
8,947,216 B2 2/2015 Da Costa et al.
8,981,915 B2 3/2015 Birnbaum et al.
8,994,518 B2 3/2015 Gregorio et al.
9,019,087 B2 4/2015 Bakircioglu et al.
9,030,428 B2 5/2015 Fleming
9,063,570 B2 6/2015 Weddle et al.
9,070,856 B1 6/2015 Rose et al.
9,083,821 B2 7/2015 Hughes
9,092,059 B2 7/2015 Bhatia
9,117,347 B2 8/2015 Matthews
9,128,523 B2 9/2015 Buuck et al.
9,164,587 B2 10/2015 Da Costa et al.
9,196,135 B2 11/2015 Shah et al.
9,248,840 B2 2/2016 Truong
9,326,066 B2 4/2016 Kilppel
9,329,721 B1 5/2016 Buuck et al.
9,354,704 B2 5/2016 Lacroix et al.
9,368,005 B2 6/2016 Cruz-Hernandez et al.
9,489,047 B2 11/2016 Jiang et al.
9,495,013 B2 11/2016 Underkoffler et al.
9,507,423 B2 11/2016 Gandhi et al.
9,513,709 B2 12/2016 Gregorio et al.
9,520,036 B1 12/2016 Buuck
9,588,586 B2 3/2017 Rihn
9,640,047 B2 5/2017 Choi et al.
9,652,041 B2 5/2017 Jiang et al.
9,696,859 B1 7/2017 Heller et al.
9,697,450 B1 7/2017 Lee
9,715,300 B2 7/2017 Sinclair et al.
9,740,381 B1 8/2017 Chaudhri et al.
9,842,476 B2 12/2017 Rihn et al.
9,864,567 B2 1/2018 Seo
9,881,467 B2 1/2018 Levesque
9,886,829 B2 2/2018 Levesque
9,946,348 B2 4/2018 Ullrich et al.
9,947,186 B2 4/2018 Macours
9,959,744 B2 5/2018 Koskan et al.
9,965,092 B2 5/2018 Smith
10,032,550 B1 7/2018 Zhang et al.
10,039,080 B2 7/2018 Miller et al.
10,055,950 B2 8/2018 Saboune et al.
10,074,246 B2 9/2018 Da Costa et al.
10,102,722 B2 10/2018 Levesque et al.
10,110,152 B1 10/2018 Hajati
10,165,358 B2 12/2018 Koudar et al.
10,171,008 B2 1/2019 Nishitani et al.
10,175,763 B2 1/2019 Shah
10,191,579 B2 1/2019 Forlines et al.
10,264,348 B1 4/2019 Harris et al.
10,275,087 B1 4/2019 Smith
10,402,031 B2 9/2019 Vandermeijden et al.
10,564,727 B2 2/2020 Billington et al.
10,620,704 B2 4/2020 Rand et al.
10,667,051 B2 5/2020 Stahl
10,726,683 B1 7/2020 Mondello et al.
10,735,956 B2 8/2020 Bae et al.
10,782,785 B2 9/2020 Hu et al.
10,795,443 B2 10/2020 Hu et al.
10,820,100 B2 10/2020 Stahl et al.
10,828,672 B2 11/2020 Stahl et al.
10,832,537 B2 11/2020 Doy et al.
10,841,696 B2 11/2020 Mamou-Mani
10,848,886 B2 11/2020 Rand
10,860,202 B2 12/2020 Sepehr et al.
10,955,955 B2 3/2021 Peso Parada et al.
10,969,871 B2 4/2021 Rand et al.
10,976,825 B2 4/2021 Das et al.
11,069,206 B2 7/2021 Rao et al.
11,079,874 B2 8/2021 Lapointe et al.
11,139,767 B2 10/2021 Janko et al.
11,150,733 B2 10/2021 Das et al.
11,259,121 B2 2/2022 Lindemann et al.
11,460,526 B1 10/2022 Foo et al.
11,500,469 B2 11/2022 Rao et al.
2001/0043714 A1 11/2001 Asada et al.
2002/0018578 A1 2/2002 Burton
2002/0085647 A1 7/2002 Oishi et al.
2003/0068053 A1 4/2003 Chu
2003/0214485 A1 11/2003 Roberts
2005/0031140 A1 2/2005 Browning
2005/0134562 A1 6/2005 Grant et al.
2005/0195919 A1 9/2005 Cova
2006/0028095 A1 2/2006 Maruyama et al.
2006/0197753 A1 9/2006 Hotelling
2007/0013337 A1 1/2007 Liu et al.
2007/0024254 A1 2/2007 Radecker et al.
2007/0241816 A1 10/2007 Okazaki et al.
2008/0077367 A1 3/2008 Odajima
2008/0226109 A1 9/2008 Yamakata et al.
2008/0240458 A1 10/2008 Goldstein et al.
2008/0293453 A1 11/2008 Atlas et al.
2008/0316181 A1 12/2008 Nurmi
2009/0020343 A1 1/2009 Rothkopf et al.
2009/0079690 A1 3/2009 Watson et al.
2009/0088220 A1 4/2009 Persson
2009/0096632 A1 4/2009 Ullrich et al.
2009/0102805 A1 4/2009 Meijer et al.
2009/0128306 A1 5/2009 Luden et al.
2009/0153499 A1 6/2009 Kim et al.
2009/0189867 A1 7/2009 Krah et al.
2009/0278819 A1 11/2009 Goldenberg et al.
2009/0279719 A1* 11/2009 Lesso .................... G01P 15/125
381/174
2009/0313542 A1 12/2009 Cruz-Hernandez et al.
2010/0013761 A1 1/2010 Birnbaum et al.
2010/0080331 A1 4/2010 Garudadri et al.
2010/0085317 A1 4/2010 Park et al.
2010/0141408 A1 6/2010 Doy et al.
2010/0141606 A1 6/2010 Bae et al.
2010/0260371 A1 10/2010 Afshar
2010/0261526 A1 10/2010 Anderson et al.
2010/0331685 A1* 12/2010 Stein .................... A61B 5/6846
600/438

(56) References Cited

U.S. PATENT DOCUMENTS

2011/0056763 A1 3/2011 Tanase et al.
2011/0075835 A1 3/2011 Hill
2011/0077055 A1 3/2011 Pakula et al.
2011/0141052 A1 6/2011 Bernstein et al.
2011/0161537 A1 6/2011 Chang
2011/0163985 A1 7/2011 Bae et al.
2011/0167391 A1 7/2011 Momeyer et al.
2012/0011436 A1 1/2012 Jinkinson et al.
2012/0105358 A1 5/2012 Momeyer et al.
2012/0105367 A1 5/2012 Son et al.
2012/0112894 A1 5/2012 Yang et al.
2012/0206246 A1 8/2012 Cruz-Hernandez et al.
2012/0206247 A1 8/2012 Bhatia et al.
2012/0229264 A1 9/2012 Bosch et al.
2012/0249462 A1 10/2012 Flanagan et al.
2012/0253698 A1 10/2012 Cokonaj
2012/0306631 A1 12/2012 Hughes
2013/0016855 A1 1/2013 Lee et al.
2013/0027359 A1 1/2013 Schevin et al.
2013/0038792 A1 2/2013 Quigley et al.
2013/0096849 A1 4/2013 Campbell et al.
2013/0141382 A1 6/2013 Simmons et al.
2013/0275058 A1 10/2013 Awad
2013/0289994 A1 10/2013 Newman et al.
2013/0307786 A1 11/2013 Heubel
2014/0035736 A1 2/2014 Weddle et al.
2014/0056461 A1 2/2014 Afshar
2014/0064516 A1 3/2014 Cruz-Hernandez et al.
2014/0079248 A1 3/2014 Short et al.
2014/0085064 A1 3/2014 Crawley et al.
2014/0118125 A1 5/2014 Bhatia
2014/0118126 A1 5/2014 Garg et al.
2014/0119244 A1 5/2014 Steer et al.
2014/0125467 A1 5/2014 Da Costa et al.
2014/0139327 A1 5/2014 Bau et al.
2014/0176415 A1 6/2014 Buuck et al.
2014/0205260 A1 7/2014 Lacroix et al.
2014/0222377 A1 8/2014 Bitan et al.
2014/0226068 A1 8/2014 Lacroix et al.
2014/0253303 A1 9/2014 Levesque
2014/0292501 A1 10/2014 Lim et al.
2014/0300454 A1 10/2014 Lacroix et al.
2014/0340209 A1 11/2014 Lacroix et al.
2014/0347176 A1 11/2014 Modarres et al.
2015/0010176 A1 1/2015 Scheveiw et al.
2015/0049882 A1 2/2015 Chiu et al.
2015/0061846 A1 3/2015 Yliaho
2015/0070149 A1 3/2015 Cruz-Hernandez et al.
2015/0070151 A1 3/2015 Cruz-Hernandez et al.
2015/0070154 A1 3/2015 Levesque et al.
2015/0070260 A1 3/2015 Saboune et al.
2015/0077324 A1 3/2015 Birnbaum et al.
2015/0084752 A1 3/2015 Heubel et al.
2015/0116205 A1 4/2015 Westerman et al.
2015/0130767 A1 5/2015 Myers et al.
2015/0201294 A1* 7/2015 Risberg .................. H04R 3/002 381/59
2015/0204925 A1 7/2015 Hernandez et al.
2015/0208189 A1 7/2015 Tsai
2015/0216762 A1 8/2015 Oohashi et al.
2015/0234464 A1 8/2015 Yliaho
2015/0249888 A1* 9/2015 Bogdanov ........... H03F 3/45475 381/98
2015/0264455 A1 9/2015 Granoto et al.
2015/0268768 A1 9/2015 Woodhull et al.
2015/0324116 A1 11/2015 Marsden et al.
2015/0325116 A1 11/2015 Umminger, III
2015/0339898 A1 11/2015 Saboune et al.
2015/0341714 A1 11/2015 Ahn et al.
2015/0356981 A1 12/2015 Johnson et al.
2016/0004311 A1 1/2016 Yliaho
2016/0007095 A1 1/2016 Lacroix
2016/0063826 A1 3/2016 Morrell et al.
2016/0070353 A1 3/2016 Lacroix et al.
2016/0070392 A1 3/2016 Wang et al.
2016/0074278 A1 3/2016 Muench et al.
2016/0097662 A1 4/2016 Chang et al.
2016/0132118 A1 5/2016 Park et al.
2016/0155305 A1 6/2016 Barsilai et al.
2016/0162031 A1 6/2016 Westerman et al.
2016/0179203 A1 6/2016 Modarres et al.
2016/0187987 A1 6/2016 Ulrich et al.
2016/0227614 A1* 8/2016 Lissoni .................. H02M 1/42
2016/0239089 A1 8/2016 Taninaka et al.
2016/0246378 A1 8/2016 Sampanes et al.
2016/0277821 A1 9/2016 Kunimoto
2016/0291731 A1 10/2016 Liu et al.
2016/0305996 A1 10/2016 Martens et al.
2016/0328065 A1 11/2016 Johnson et al.
2016/0358605 A1 12/2016 Ganong, III et al.
2017/0052593 A1 2/2017 Jiang et al.
2017/0078804 A1 3/2017 Guo et al.
2017/0083096 A1 3/2017 Rihn et al.
2017/0090572 A1 3/2017 Holenarsipur et al.
2017/0090573 A1 3/2017 Hajati et al.
2017/0097381 A1 4/2017 Stephens et al.
2017/0153760 A1 6/2017 Chawda et al.
2017/0168574 A1 6/2017 Zhang
2017/0168773 A1 6/2017 Keller et al.
2017/0169674 A1 6/2017 Macours
2017/0180863 A1 6/2017 Biggs et al.
2017/0220197 A1 8/2017 Matsumoto et al.
2017/0256145 A1 9/2017 Macours et al.
2017/0277350 A1 9/2017 Wang et al.
2017/0277360 A1 9/2017 Breedvelt-Shouten et al.
2017/0031495 A1 12/2017 Tse
2017/0357440 A1 12/2017 Tse
2018/0021811 A1 1/2018 Kutej et al.
2018/0033946 A1 2/2018 Kemppinen et al.
2018/0059733 A1 3/2018 Gault et al.
2018/0059793 A1 3/2018 Hajati
2018/0067557 A1 3/2018 Robert et al.
2018/0074637 A1 3/2018 Rosenberg et al.
2018/0082673 A1 3/2018 Tzanetos
2018/0084362 A1 3/2018 Zhang et al.
2018/0095596 A1 4/2018 Turgeman
2018/0139538 A1 5/2018 Macours
2018/0151036 A1 5/2018 Cha et al.
2018/0158289 A1 6/2018 Vasilev et al.
2018/0159452 A1 6/2018 Eke et al.
2018/0159457 A1 6/2018 Eke
2018/0159545 A1 6/2018 Eke et al.
2018/0160227 A1 6/2018 Lawrence et al.
2018/0165925 A1 6/2018 Israr et al.
2018/0178114 A1 6/2018 Mizuta et al.
2018/0182212 A1 6/2018 Li et al.
2018/0183372 A1 6/2018 Li et al.
2018/0194369 A1 7/2018 Lisseman et al.
2018/0196567 A1 7/2018 Klein et al.
2018/0224963 A1 8/2018 Lee et al.
2018/0227063 A1 8/2018 Heubel et al.
2018/0237033 A1 8/2018 Hakeem et al.
2018/0206282 A1 9/2018 Singh
2018/0253123 A1 9/2018 Levesque et al.
2018/0255411 A1 9/2018 Lin et al.
2018/0267897 A1 9/2018 Jeong
2018/0294757 A1 10/2018 Feng et al.
2018/0301060 A1 10/2018 Israr et al.
2018/0304310 A1 10/2018 Long et al.
2018/0321056 A1 11/2018 Yoo et al.
2018/0321748 A1 11/2018 Rao et al.
2018/0323725 A1 11/2018 Cox et al.
2018/0329172 A1 11/2018 Tabuchi
2018/0335848 A1 11/2018 Moussette et al.
2018/0367897 A1 12/2018 Bjork et al.
2019/0020760 A1 1/2019 DeBates et al.
2019/0033348 A1* 1/2019 Zeleznik .................. G01D 5/24
2019/0035235 A1 1/2019 Da Costa et al.
2019/0227628 A1 1/2019 Rand et al.
2019/0044651 A1 2/2019 Nakada
2019/0051229 A1 2/2019 Ozguner et al.
2019/0064925 A1 2/2019 Kim et al.
2019/0069088 A1 2/2019 Seiler
2019/0073078 A1 3/2019 Sheng et al.

(56) References Cited

U.S. PATENT DOCUMENTS

| | | | |
|---|---|---|---|
| 2019/0102031 A1 | 4/2019 | Shutzberg et al. | |
| 2019/0103829 A1 | 4/2019 | Vasudevan et al. | |
| 2019/0138098 A1 | 5/2019 | Shah | |
| 2019/0163234 A1 | 5/2019 | Kim et al. | |
| 2019/0196596 A1 | 6/2019 | Yokoyama et al. | |
| 2019/0206396 A1 | 7/2019 | Chen | |
| 2019/0215349 A1 | 7/2019 | Adams et al. | |
| 2019/0220095 A1 | 7/2019 | Ogita et al. | |
| 2019/0228619 A1 | 7/2019 | Yokoyama et al. | |
| 2019/0114496 A1 | 8/2019 | Lesso | |
| 2019/0235629 A1 | 8/2019 | Hu et al. | |
| 2019/0253031 A1 | 8/2019 | Vellanki et al. | |
| 2019/0294247 A1 | 9/2019 | Hu et al. | |
| 2019/0295755 A1 | 9/2019 | Konradi et al. | |
| 2019/0296674 A1 | 9/2019 | Janko et al. | |
| 2019/0297418 A1 | 9/2019 | Stahl | |
| 2019/0305851 A1 | 10/2019 | Vegas-Olmos et al. | |
| 2019/0311590 A1 | 10/2019 | Doy et al. | |
| 2019/0341903 A1 | 11/2019 | Kim | |
| 2019/0384393 A1 | 12/2019 | Cruz-Hernandez et al. | |
| 2019/0384898 A1 | 12/2019 | Chen et al. | |
| 2020/0117506 A1 | 4/2020 | Chan | |
| 2020/0139403 A1 | 5/2020 | Palit | |
| 2020/0150767 A1 | 5/2020 | Karimi Eskandary et al. | |
| 2020/0218352 A1 | 7/2020 | Macours et al. | |
| 2020/0231085 A1 | 7/2020 | Kunii et al. | |
| 2020/0306796 A1 | 10/2020 | Lindemann et al. | |
| 2020/0313529 A1 | 10/2020 | Lindemann | |
| 2020/0313654 A1 | 10/2020 | Marchais et al. | |
| 2020/0314969 A1* | 10/2020 | Marchais | H02M 7/48 |
| 2020/0342724 A1 | 10/2020 | Marchais et al. | |
| 2020/0348249 A1 | 11/2020 | Marchais et al. | |
| 2020/0395908 A1* | 12/2020 | Schindler | H03F 3/183 |
| 2020/0403546 A1 | 12/2020 | Janko et al. | |
| 2021/0108975 A1 | 4/2021 | Peso Parada et al. | |
| 2021/0125469 A1 | 4/2021 | Alderson | |
| 2021/0153562 A1 | 5/2021 | Fishwick et al. | |
| 2021/0157436 A1 | 5/2021 | Peso Parada et al. | |
| 2021/0174777 A1 | 6/2021 | Marchais et al. | |
| 2021/0175869 A1 | 6/2021 | Taipale | |
| 2021/0200316 A1 | 7/2021 | Das et al. | |
| 2021/0325967 A1* | 10/2021 | Khenkin | B06B 1/0261 |
| 2021/0328535 A1 | 10/2021 | Khenkin et al. | |
| 2021/0360347 A1* | 11/2021 | Aschieri | H03F 3/45475 |
| 2021/0365118 A1 | 11/2021 | Rajapurkar et al. | |
| 2022/0026989 A1 | 1/2022 | Rao et al. | |
| 2022/0328752 A1 | 10/2022 | Lesso et al. | |
| 2022/0404398 A1 | 12/2022 | Reynaga et al. | |
| 2022/0408181 A1 | 12/2022 | Hendrix et al. | |

FOREIGN PATENT DOCUMENTS

| | | | |
|---|---|---|---|
| CN | 104811838 | A | 7/2015 |
| CN | 204903757 | U | 12/2015 |
| CN | 105264551 | A | 1/2016 |
| CN | 106438890 | A | 2/2017 |
| CN | 103403796 | A | 7/2017 |
| CN | 106950832 | A | 7/2017 |
| CN | 107665051 | A | 2/2018 |
| CN | 107835968 | A | 3/2018 |
| CN | 210628147 | U | 5/2020 |
| CN | 113268138 | A | 8/2021 |
| CN | 114237414 | A | 3/2022 |
| EP | 0784844 | B1 | 6/2005 |
| EP | 2306269 | A1 | 4/2011 |
| EP | 2363785 | A1 | 9/2011 |
| EP | 2487780 | A1 | 8/2012 |
| EP | 2600225 | A1 | 6/2013 |
| EP | 2846218 | A1 | 3/2015 |
| EP | 2846229 | A2 | 3/2015 |
| EP | 2846329 | A1 | 3/2015 |
| EP | 2988528 | A1 | 2/2016 |
| EP | 3125508 | A1 | 2/2017 |
| EP | 3379382 | A1 | 9/2018 |
| EP | 3546035 | A1 | 10/2019 |
| GB | 201620746 | A | 1/2017 |
| GB | 2526881 | B | 10/2017 |
| IN | 201747044027 | | 8/2018 |
| JP | H02130433 | B2 | 5/1990 |
| JP | 08149006 | A | 6/1996 |
| JP | H10184782 | A | 7/1998 |
| JP | 6026751 | B2 | 11/2016 |
| JP | 6250985 | | 12/2017 |
| JP | 6321351 | | 5/2018 |
| KR | 20120126446 | A | 11/2012 |
| WO | 2013104919 | A1 | 7/2013 |
| WO | 2013186845 | A1 | 12/2013 |
| WO | 2014018086 | A1 | 1/2014 |
| WO | 2014094283 | A1 | 6/2014 |
| WO | 2016105496 | A1 | 6/2016 |
| WO | 2016164193 | A1 | 10/2016 |
| WO | 2017034973 | A1 | 3/2017 |
| WO | 2017113651 | A1 | 7/2017 |
| WO | 2017113652 | A1 | 7/2017 |
| WO | 2018053159 | A1 | 3/2018 |
| WO | 2018067613 | A1 | 4/2018 |
| WO | 2018125347 | A1 | 7/2018 |
| WO | 2020004840 | A1 | 1/2020 |
| WO | 2020055405 | A1 | 3/2020 |

OTHER PUBLICATIONS

Examination Report, Intellectual Property India, Application No. 202117019138, dated Jan. 4, 2023.

Search Report, China National Intellectual Property Administration, Application No. 2019107179621, dated Jan. 11, 2023.

First Office Action, China National Intellectual Property Administration, Application No. 2019107179621, dated Jan. 19, 2023.

Examination Report under Section 18(3), UKIPO, Application No. GB2113228.7, dated Feb. 10, 2023.

Examination Report under Section 18(3), UKIPO, Application No. GB2113154.5, dated Feb. 17, 2023.

Examination Report under Section 18(3), UKIPO, Application No. GB2117488.3, dated Apr. 27, 2023.

Combined Search and Examination Report under Sections 17 and 18(3), UKIPO, Application No. GB2210174.5, dated Aug. 1, 2022.

Examination Report under Sections 17 and 18(3), UKIPO, Application No. GB2112207.2, dated Aug. 18, 2022.

International Search Report and Written Opinion of the International Searching Authority, International Application No. PCT/US2022/030541, dated Sep. 1, 2022.

Vanderborght, B. et al., Variable impedance actuators: A review; Robotics and Autonomous Systems 61, Aug. 6, 2013, pp. 1601-1614.

International Search Report and Written Opinion of the International Searching Authority, International Application No. PCT/US2022/033190, dated Sep. 8, 2022.

International Search Report and Written Opinion of the International Searching Authority, International Application No. PCT/US2022/033230, dated Sep. 15, 2022.

Examination Report under Section 18(3), UKIPO, Application No. GB2115048.7, dated Aug. 24, 2022.

Communication pursuant to Article 94(3) EPC, European Patent Office, Application No. 18727512.8, dated Sep. 26, 2022.

Examination Report under Section 18(3), United Kingdom Intellectual Property Office, Application No. GB2106247.6, dated Mar. 31, 2022.

International Search Report and Written Opinion of the International Searching Authority, International Application No. PCT/GB2019/050964, dated Sep. 3, 2019.

International Search Report and Written Opinion of the International Searching Authority, International Application No. PCT/GB2019/050770, dated Jul. 5, 2019.

Communication Relating to the Results of the Partial International Search, and Provisional Opinion Accompanying the Partial Search Result, of the International Searching Authority, International Application No. PCT/US2018/031329, dated Jul. 20, 2018.

Combined Search and Examination Report, UKIPO, Application No. GB1720424.9, dated Jun. 5, 2018.

(56) References Cited

OTHER PUBLICATIONS

International Search Report and Written Opinion of the International Searching Authority, International Application No. PCT/GB2019/052991, dated Mar. 17, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/GB2020/051037, dated Jul. 9, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
First Examination Opinion Notice, State Intellectual Property Office of the People's Republic of China, Application No. 201880037435.X, dated Dec. 31, 2020.
International Search Report and Written Opinion of the International Searching Authority, International Application No. PCT/US2020/056610, dated Jan. 21, 2021.
Second Office Action, National Intellectual Property Administration, PRC, Application No. 2019107179621, dated May 24, 2023.
Examination Report under Section 18(3), UKIPO, Application No. GB2113228.7, dated Jun. 28, 2023.
Combined Search and Examination Report under Sections 17 and 18(3), UKIPO, Application No. GB2204956.3, dated Jul. 24, 2023.
Invitation to Pay Additional Fees, Partial International Search Report and Provisional Opinion of the International Searching Authority, International Application No. PCT/US2020/052537, dated Jan. 14, 2021.
International Search Report and Written Opinion of the International Searching Authority, International Application No. PCT/GB2020/052537, dated Mar. 9, 2021.
Office Action of the Intellectual Property Office, ROC (Taiwan) Patent Application No. 107115475, dated Apr. 30, 2021.
First Office Action, China National Intellectual Property Administration, Patent Application No. 2019800208570, dated Jun. 3, 2021.
International Search Report and Written Opinion of the International Searching Authority, International Application No. PCT/US2021/021908, dated Jun. 9, 2021.
Notice of Preliminary Rejection, Korean Intellectual Property Office, Application No. 10-2019-7036236, dated Jun. 29, 2021.
Combined Search and Examination Report, United Kingdom Intellectual Property Office, Application No. GB2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800211287, dated Jul. 5, 2021.
Steinbach et al., Haptic Data Compression and Communication, IEEE Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Examination Report under Section 18(3), United Kingdom Intellectual Property Office, Application No. GB2018051.9, dated Nov. 5, 2021.
Jaijongrak et al., A Haptic and Auditory Assistive User Interface: Helping the Blinds on their Computer Operations, 2011 IEEE International Conference on Rehabilitation Robotics, Rehab Week Zurich, ETH Zurich Science City, Switzerland, Jun. 29-Jul. 1, 2011.
Lim et al., An Audio-Haptic Feedbacks for Enhancing User Experience in Mobile Devices, 2013 IEEE International Conference on Consumer Electronics (ICCE).
Weddle et al., How Does Audio-Haptic Enhancement Influence Emotional Response to Mobile Media, 2013 Fifth International Workshop on Quality of Multimedia Experience (QoMEX), QMEX 2013.
Danieau et al., Enhancing Audiovisual Experience with Haptic Feedback: A Survey on HAV, IEEE Transactions on Haptics, vol. 6, No. 2, Apr.-Jun. 2013.
Danieau et al., Toward Haptic Cinematography: Enhancing Movie Experiences with Camera-Based Haptic Effects, IEEE Computer Society, IEEE MultiMedia, Apr.-Jun. 2014.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.
Second Office Action, National Intellectual Property Administration, PRC, Application No. 2019800208570, dated Jan. 19, 2022.

* cited by examiner

METHODS AND SYSTEMS FOR DETECTING AND MANAGING UNEXPECTED SPECTRAL CONTENT IN AN AMPLIFIER SYSTEM

RELATED APPLICATION

The present disclosure claims priority to U.S. Provisional Patent Application Ser. No. 63/213,357, filed Jun. 22, 2021, which is incorporated by reference herein in its entirety.

The present disclosure also relates to U.S. Provisional Patent Application Ser. No. 62/944,426, filed Dec. 6, 2019, which is incorporated by reference herein in its entirety.

FIELD OF DISCLOSURE

The present disclosure relates in general to detecting unexpected spectral content in an amplifier system, such as an amplifier used to drive a haptic vibrational load, and the management of such unexpected spectral content.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin, and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

FIG. 1 illustrates an example of a vibro-haptic system in a device 100. Device 100 may comprise a controller 101 configured to control a signal applied to an amplifier 102. Amplifier 102 may then drive a haptic transducer 103 based on the signal. Controller 101 may be triggered by a trigger to output to the signal. The trigger may for example comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2*\pi*\sqrt{C*M}} \tag{1}$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, component changes caused by self-heating, and use conditions such as various different strengths of a user gripping of the device, the vibration resonance of the haptic transducer may vary from time to time.

FIG. 2A illustrates an example of a linear resonant actuator (LRA) modelled as a linear system including a mass-spring system 201. LRAs are non-linear components that may behave differently depending on, for example, the voltage levels applied, the operating temperature, and the frequency of operation. However, these components may be modelled as linear components within certain conditions.

FIG. 2B illustrates an example of an LRA modelled as a linear system, including an electrically equivalent model of mass-spring system 201 of LRA. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

An electromagnetic load such as an LRA may be characterized by its impedance $Z_{LRA}$ as seen as the sum of a coil impedance $Z_{coil}$ and a mechanical impedance $Z_{mech}$:

$$Z_{LRA}=Z_{coil}+Z_{mech} \tag{2}$$

Coil impedance $Z_{coil}$ may in turn comprise a direct current (DC) resistance Re in series with an inductance Le:

$$Z_{coil}=\mathrm{Re}+s*Le \tag{3}$$

Mechanical impedance $Z_{mech}$ may be defined by three parameters including the resistance at resonance $R_{RES}$ representing an electrical resistance representative of mechanical friction of the mass-spring system of the haptic transducer, a capacitance $C_{MES}$ representing an electrical capacitance representative of an equivalent moving mass M of the mass-spring system of the haptic transducer, and inductance $L_{CES}$ representative of a compliance C of the mass-spring system of the haptic transducer. The electrical equivalent of the total mechanical impedance is the parallel connection of $R_{RES}$, $C_{MES}$, $L_{CES}$. The Laplace transform of this parallel connection is described by:

$$Z_{mech}(s) = \frac{1}{\left(\frac{1}{R_{RES}} + \frac{1}{L_{CES}*s} + C_{MES}*s\right)} \tag{4}$$

The resonant frequency $f_0$ of the haptic transducer can be represented as:

$$f_0 = \frac{1}{\left(2*\pi*\sqrt{L_{CES}*C_{MES}*}\right)} \tag{5}$$

The quality factor Q of the LRA can be represented as:

$$Q = \frac{R_{RES}*Re}{R_{RES}+Re}*\sqrt{\frac{C_{MES}}{L_{CES}}} \tag{6}$$

Referring to equation (6), it may appear non-intuitive that the expression involves a subexpression describing the parallel connection of resistances Re and $R_{RES}$ $$\left(\text{i.e., } \frac{R_{RES} * Re}{R_{RES} + Re}\right)$$

while in FIG. 2B these resistances are shown in a series connection. However, such may be the case where a driving voltage Ve is oscillating but then abruptly turns off and goes to zero. The voltage amplifier shown in FIG. 2B may be considered to have a low source impedance, ideally zero source impedance. Under these conditions, when driving voltage Ve goes to zero, the voltage amplifier effectively disappears from the circuit. At that point, the top-most terminal of resistance Re in FIG. 2B is grounded as is the bottom-most terminal of resistance $R_{RES}$ and so resistances Re and $R_{RES}$ are indeed connected in parallel as reflected in equation (6).

Electromagnetic transducers, such as LRAs or microspeakers, may have slow response times. FIG. 3 is a graph of an example response of an LRA, depicting an example driving signal to the LRA, a current through the LRA, and a back electromotive force (back EMF) of the LRA, wherein such back EMF may be proportional to the velocity of a moving element (e.g., coil or magnet) of the transducer. As shown in FIG. 3, the attack time of the back EMF may be slow as energy is transferred to the LRA, and some "ringing" of the back EMF may occur after the driving signal has ended as the mechanical energy stored in the LRA is discharged. In the context of a haptic LRA, such behavioral characteristic may result in a "mushy" feeling click or pulse, instead of a "crisp" tactile response. Thus, it may be desirable for an LRA to instead have a response similar to that shown in FIG. 4, in which there exists minimal ringing after the driving signal has ended, and which may provide a more "crisp" tactile response in a haptic context. Accordingly, it may be desirable to apply processing to a driving signal such that when the processed driving signal is applied to the transducer, the velocity or back EMF of the transducer more closely approaches that of FIG. 4. One way to provide such processing is to cancel some of the impedance presence in the driving circuit.

The impedances of an electromagnetic transducer may vary across time, use, part variations, and/or temperature. Thus, a constant impedance cancellation may be problematic if the cancellation is not matched to the part. If the cancellation is incomplete, the LRA response may ring too much and make the haptic effect feel "mushy" to a user. If too much cancellation is applied, the apparent source resistance may become negative. Such negative resistance may result in unstable behavior of the system (e.g., signal oscillations may occur independent of the desired response).

For such a system to remain reliably stable, a way to detect and compensate for unstable behavior is desired so the control loop can be corrected.

SUMMARY

In accordance with the teachings of the present disclosure, the disadvantages and problems associated with detecting unexpected spectral content in an amplifier system may be reduced or eliminated.

In accordance with embodiments of the present disclosure, a method may include receiving, by a transducer driving system, a first signal for driving an amplifier that drives an electromagnetic load and receiving, by the transducer driving system, a second signal driven by the amplifier in order to control a feedback loop of the transducer driving system. The method may also include detecting unexpected spectral content in the second signal, declaring an indicator event based on the detected unexpected spectral content, determining whether the indicator event occurs in an undesired pattern, and in response to the indicator event occurring in the undesired pattern, modifying a behavior of the transducer driving system.

In accordance with these and other embodiments of the present disclosure, a method may include receiving, by a transducer driving system, a first signal for driving an amplifier that drives an electromagnetic load and receiving, by the transducer driving system, a second signal driven by the amplifier in order to control a feedback loop of the transducer driving system. The method may also include detecting unexpected spectral content in the second signal. The method may further include, in response to detecting the unexpected spectral content, modifying a system behavior of the transducer driving system by monitoring the unexpected spectral content and the second signal for patterns that identify a physical damage of the electromagnetic load and modifying a signal gain applied to the first signal to protect the transducer driving system.

In accordance with these and other embodiments of the present disclosure, a transducer driving system may include a driver output for driving an amplifier that drives an electromagnetic load, a feedback input for receiving a signal driven by the amplifier in order to control a feedback loop of the transducer driving system, and an unexpected spectral content detector and controller subsystem. The unexpected spectral content detector and controller subsystem may be configured to detect unexpected spectral content in the signal, declare an indicator event based on the detected unexpected spectral content, determine whether the indicator event occurs in an undesired pattern, and in response to the indicator event occurring in the undesired pattern, modify a behavior of the transducer driving system.

In accordance with these and other embodiments of the present disclosure, a transducer driving system may include a driver output for driving an amplifier that drives an electromagnetic load, a feedback input for receiving a signal driven by the amplifier in order to control a feedback loop of the transducer driving system; and an unexpected spectral content detector and controller subsystem. The unexpected spectral content detector and controller subsystem may be configured to detect unexpected spectral content in the signal and in response to detecting the unexpected spectral content, modify a system behavior of the transducer driving system by monitoring the unexpected spectral content and the second signal for patterns that identify a physical damage of the electromagnetic load and modifying a signal gain applied to the first signal to protect the transducer driving system.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal will generally be an analog time varying voltage signal, for example, a time varying waveform.

Figure 5:
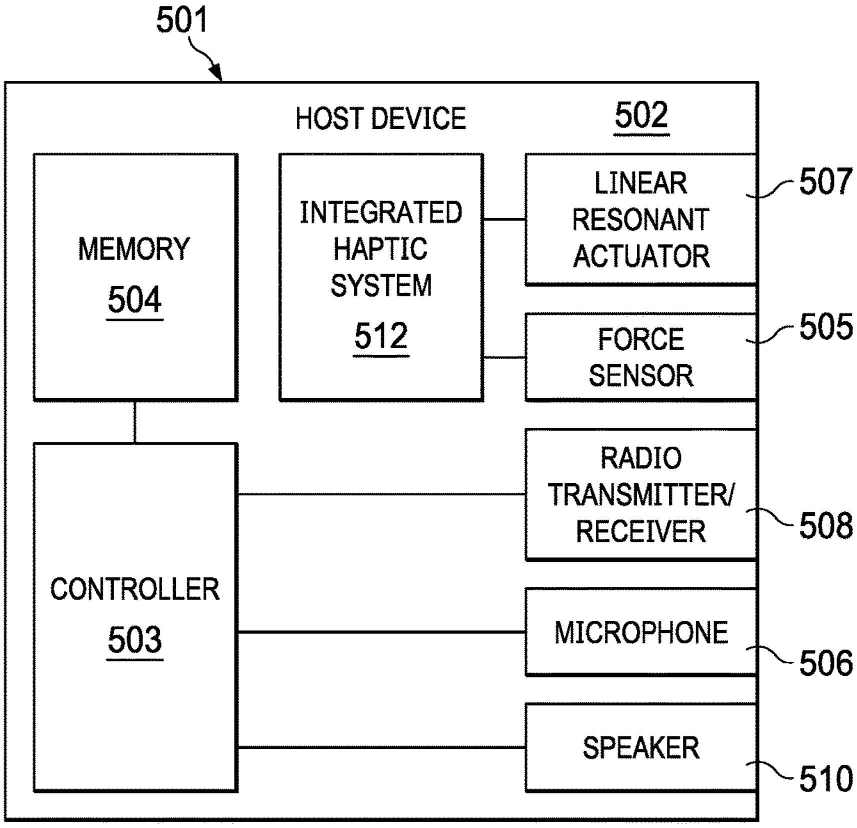
FIG. 5 illustrates a block diagram of selected components of an example mobile device, in accordance with embodiments of the present disclosure.

FIG. 5 illustrates a block diagram of selected components of an example host device 502, in accordance with embodiments of the present disclosure. As shown in FIG. 5, host device 502 may comprise an enclosure 501, a controller 503, a memory 504, a force sensor 505, a microphone 506, a linear resonant actuator 507, a radio transmitter/receiver 508, a speaker 510, and an integrated haptic system 512.

Enclosure 501 may comprise any suitable housing, casing, or other enclosure for housing the various components of host device 502. Enclosure 501 may be constructed from plastic, metal, and/or any other suitable materials. In addition, enclosure 501 may be adapted (e.g., sized and shaped) such that host device 502 is readily transported on a person of a user of host device 502. Accordingly, host device 502 may include but is not limited to a smart phone, a tablet computing device, a handheld computing device, a personal digital assistant, a notebook computer, a video game controller, or any other device that may be readily transported on a person of a user of host device 502.

Controller 503 may be housed within enclosure 501 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 503 interprets and/or executes program instructions and/or processes data stored in memory 504 and/or other computer-readable media accessible to controller 503.

Memory 504 may be housed within enclosure 501, may be communicatively coupled to controller 503, and may include any system, device, or apparatus configured to retain program instructions and/or data for a period of time (e.g., computer-readable media). Memory 504 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to host device 502 is turned off.

Microphone 506 may be housed at least partially within enclosure 501, may be communicatively coupled to controller 503, and may comprise any system, device, or apparatus configured to convert sound incident at microphone 506 to an electrical signal that may be processed by controller 503, wherein such sound is converted to an electrical signal using a diaphragm or membrane having an electrical capacitance that varies based on sonic vibrations received at the diaphragm or membrane. Microphone 506 may include an electrostatic microphone, a condenser microphone, an electret microphone, a microelectromechanical systems (MEMS) microphone, or any other suitable capacitive microphone.

Radio transmitter/receiver 508 may be housed within enclosure 501, may be communicatively coupled to controller 503, and may include any system, device, or apparatus configured to, with the aid of an antenna, generate and transmit radio-frequency signals as well as receive radio-frequency signals and convert the information carried by such received signals into a form usable by controller 503. Radio transmitter/receiver 508 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 510 may be housed at least partially within enclosure 501 or may be external to enclosure 501, may be communicatively coupled to controller 503, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 505 may be housed within enclosure 501, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given. Force sensor 505 may include, without limitation, a capacitive displacement sensor, an inductive force sensor (e.g., a resistive-inductive-capacitive sensor), a strain gauge, a piezoelectric force sensor, force sensing resistor, piezoelectric force sensor, thin film force sensor, or a quantum tunneling composite-based force sensor. For purposes of clarity and exposition in this disclosure, the term "force" as used herein may refer not only to force, but to physical quantities indicative of force or analogous to force, such as, but not limited to, pressure and touch.

Linear resonant actuator 507 may be housed within enclosure 501, and may include any suitable system, device, or apparatus for producing an oscillating mechanical force across a single axis. For example, in some embodiments, linear resonant actuator 507 may rely on an alternating current voltage to drive a voice coil pressed against a moving mass connected to a spring. When the voice coil is driven at the resonant frequency of the spring, linear resonant actuator 507 may vibrate with a perceptible force. Thus, linear resonant actuator 507 may be useful in haptic applications within a specific frequency range. While, for the purposes of clarity and exposition, this disclosure is described in relation to the use of linear resonant actuator 507, it is understood that any other type or types of vibrational actuators (e.g., eccentric rotating mass actuators) may be used in lieu of or in addition to linear resonant actuator 507. In addition, it is also understood that actuators arranged to produce an oscillating mechanical force across multiple axes may be used in lieu of or in addition to linear resonant actuator 507. As described elsewhere in this disclosure, a linear resonant actuator 507, based on a signal received from integrated haptic system 512, may render haptic feedback to a user of host device 502 for at least one of mechanical button replacement and capacitive sensor feedback.

Integrated haptic system 512 may be housed within enclosure 501, may be communicatively coupled to force sensor 505 and linear resonant actuator 507, and may include any system, device, or apparatus configured to receive a signal from force sensor 505 indicative of a force applied to host device 502 (e.g., a force applied by a human finger to a virtual button of host device 502) and generate an electronic signal for driving linear resonant actuator 507 in response to the force applied to host device 502. Detail of an example integrated haptic system in accordance with embodiments of the present disclosure is depicted in FIG. 6.

Although specific example components are depicted above in FIG. 5 as being integral to host device 502 (e.g., controller 503, memory 504, force sensor 505, microphone 506, radio transmitter/receiver 508, speakers(s) 510), a host device 502 in accordance with this disclosure may comprise one or more components not specifically enumerated above. For example, although FIG. 5 depicts certain user interface components, host device 502 may include one or more other user interface components in addition to those depicted in FIG. 5 (including but not limited to a keypad, a touch screen, and a display), thus allowing a user to interact with and/or otherwise manipulate host device 502 and its associated components.

Figure 6:
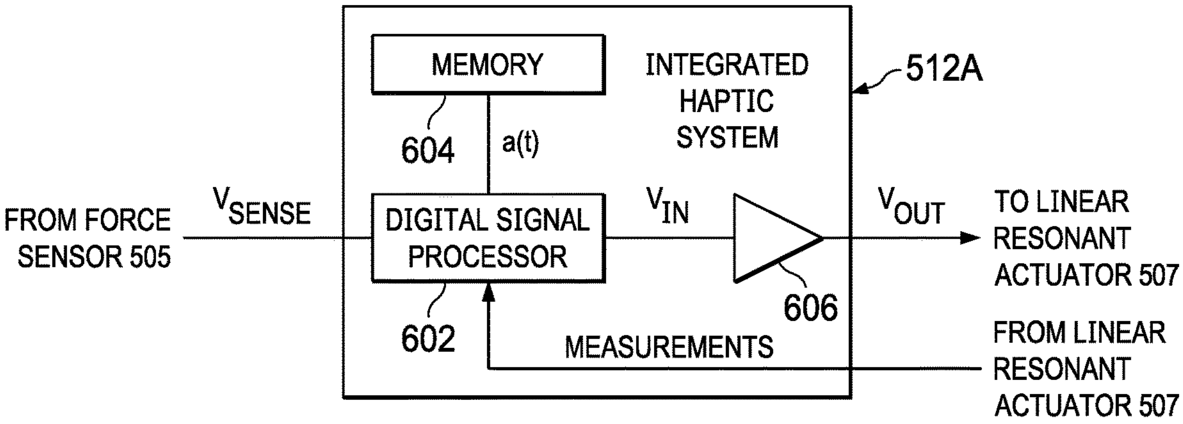
FIG. 6 illustrates a block diagram of selected components of an example integrated haptic system, in accordance with embodiments of the present disclosure.

FIG. 6 illustrates a block diagram of selected components of an example integrated haptic system 512A, in accordance with embodiments of the present disclosure. In some embodiments, integrated haptic system 512A may be used to implement integrated haptic system 512 of FIG. 5. As shown in FIG. 6, integrated haptic system 512A may include a digital signal processor (DSP) 602, a memory 604, and an amplifier 606.

DSP 602 may include any system, device, or apparatus configured to interpret and/or execute program instructions and/or process data. In some embodiments, DSP 602 may interpret and/or execute program instructions and/or process data stored in memory 604 and/or other computer-readable media accessible to DSP 602.

Memory 604 may be communicatively coupled to DSP 602, and may include any system, device, or apparatus configured to retain program instructions and/or data for a period of time (e.g., computer-readable media). Memory 604 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to host device 502 is turned off.

Amplifier 606 may be electrically coupled to DSP 602 and may comprise any suitable electronic system, device, or apparatus configured to increase the power of an input signal $V_{IN}$ (e.g., a time-varying voltage or current) to generate an output signal $V_{OUT}$. For example, amplifier 606 may use electric power from a power supply (not explicitly shown) to increase the amplitude of a signal. Amplifier 606 may include any suitable amplifier class, including without limitation, a Class-D amplifier.

In operation, memory 604 may store one or more haptic playback waveforms. In some embodiments, each of the one or more haptic playback waveforms may define a haptic response a(t) as a desired acceleration of a linear resonant actuator (e.g., linear resonant actuator 507) as a function of time. DSP 602 may be configured to receive a force signal $V_{SENSE}$ indicative of force applied to force sensor 505. Either in response to receipt of force signal $V_{SENSE}$ indicating a sensed force or independently of such receipt, DSP 602 may retrieve a haptic playback waveform from memory 604 and process such haptic playback waveform to determine a processed haptic playback signal $V_{IN}$. In embodiments in which amplifier 606 is a Class D amplifier, processed haptic playback signal $V_{IN}$ may comprise a pulse-width modulated signal. In response to receipt of force signal $V_{SENSE}$ indicating a sensed force, DSP 602 may cause processed haptic playback signal $V_{IN}$ to be output to amplifier 606, and amplifier 606 may amplify processed haptic playback signal $V_{IN}$ to generate a haptic output signal $V_{OUT}$ for driving linear resonant actuator 507.

In some embodiments, integrated haptic system 512A may be formed on a single integrated circuit, thus enabling lower latency than existing approaches to haptic feedback control. By providing integrated haptic system 512A as part of a single monolithic integrated circuit, latencies between various interfaces and system components of integrated haptic system 512A may be reduced or eliminated.

Figure 1:
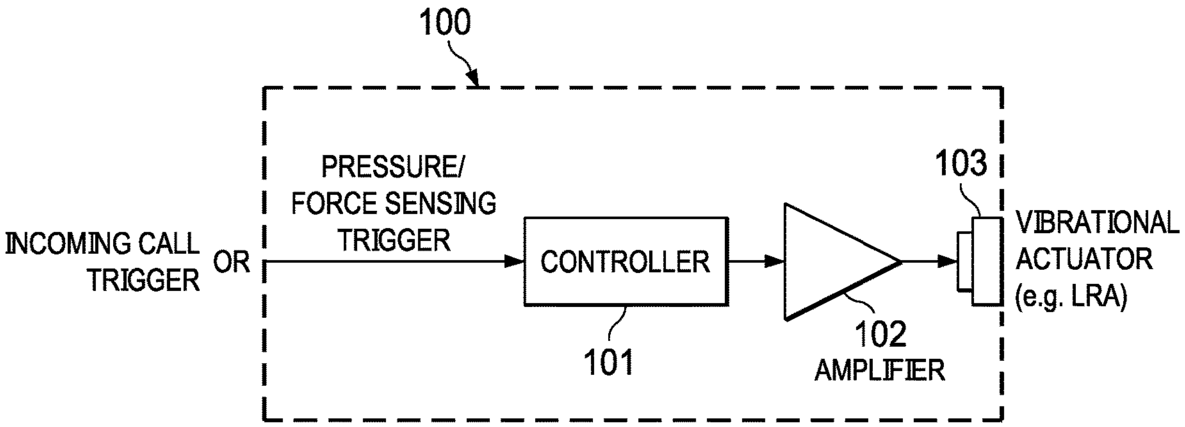
FIG. 1 (PRIOR ART)
FIG. 1 illustrates an example of a vibro-haptic system in a device, as is known in the art.
Figure 2A:
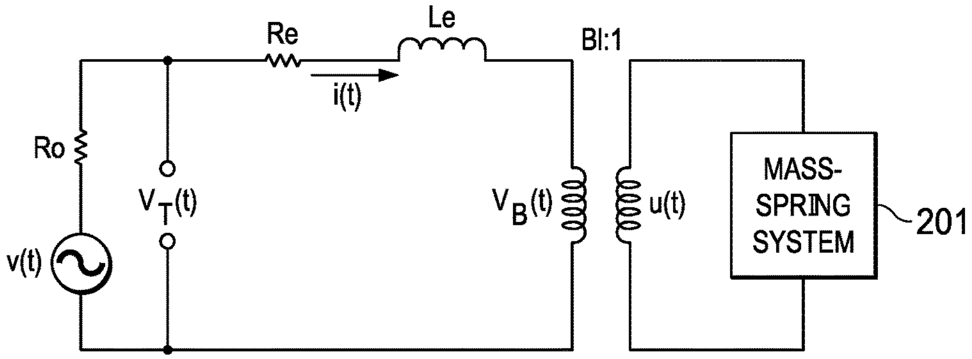
FIG. 2A (PRIOR ART)
FIGS. 2A and 2B each illustrate an example of a Linear Resonant Actuator (LRA) modelled as a linear system, as is known in the art.
Figure 2B:
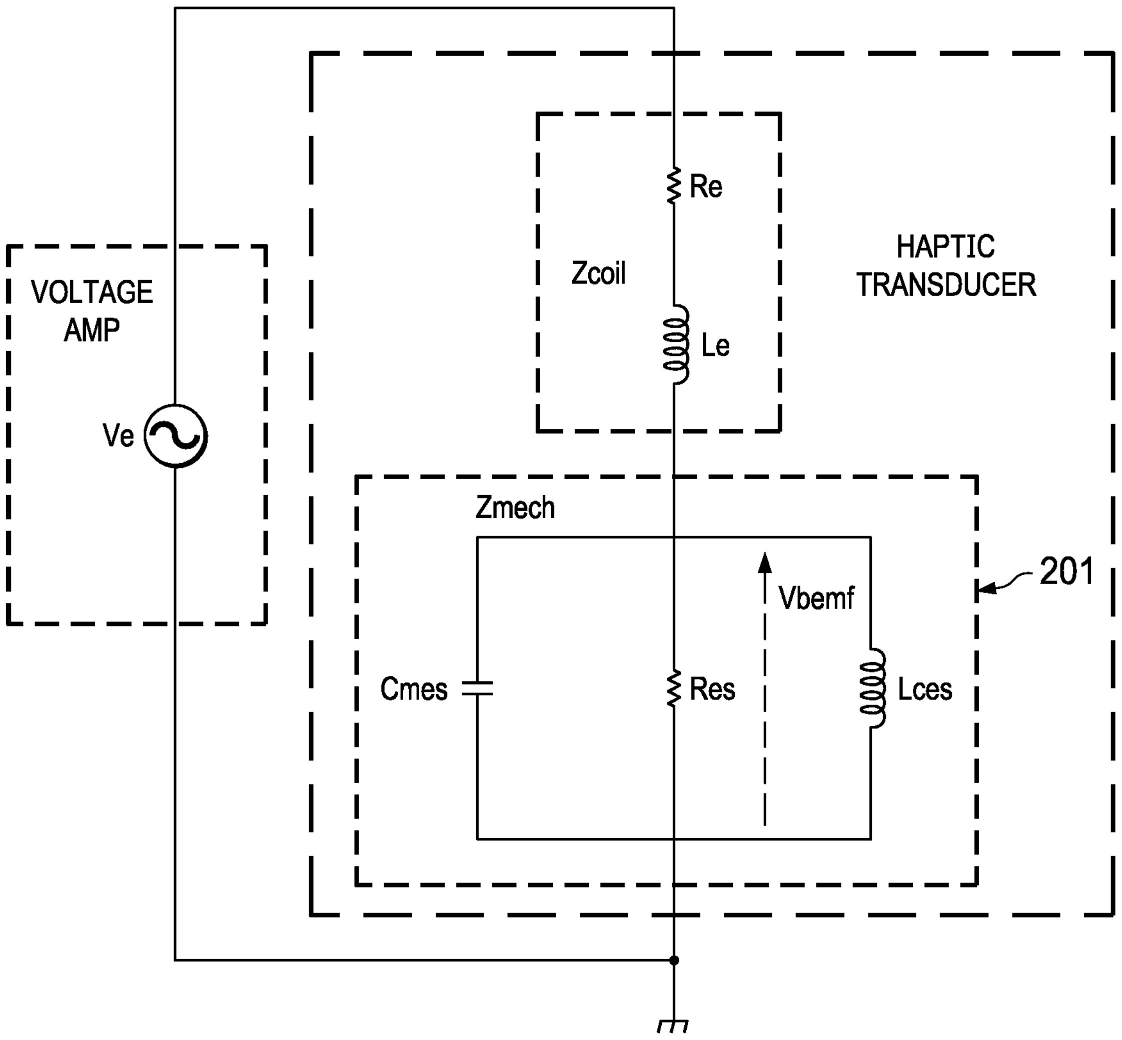
FIG. 2B (PRIOR ART)
Figure 3:
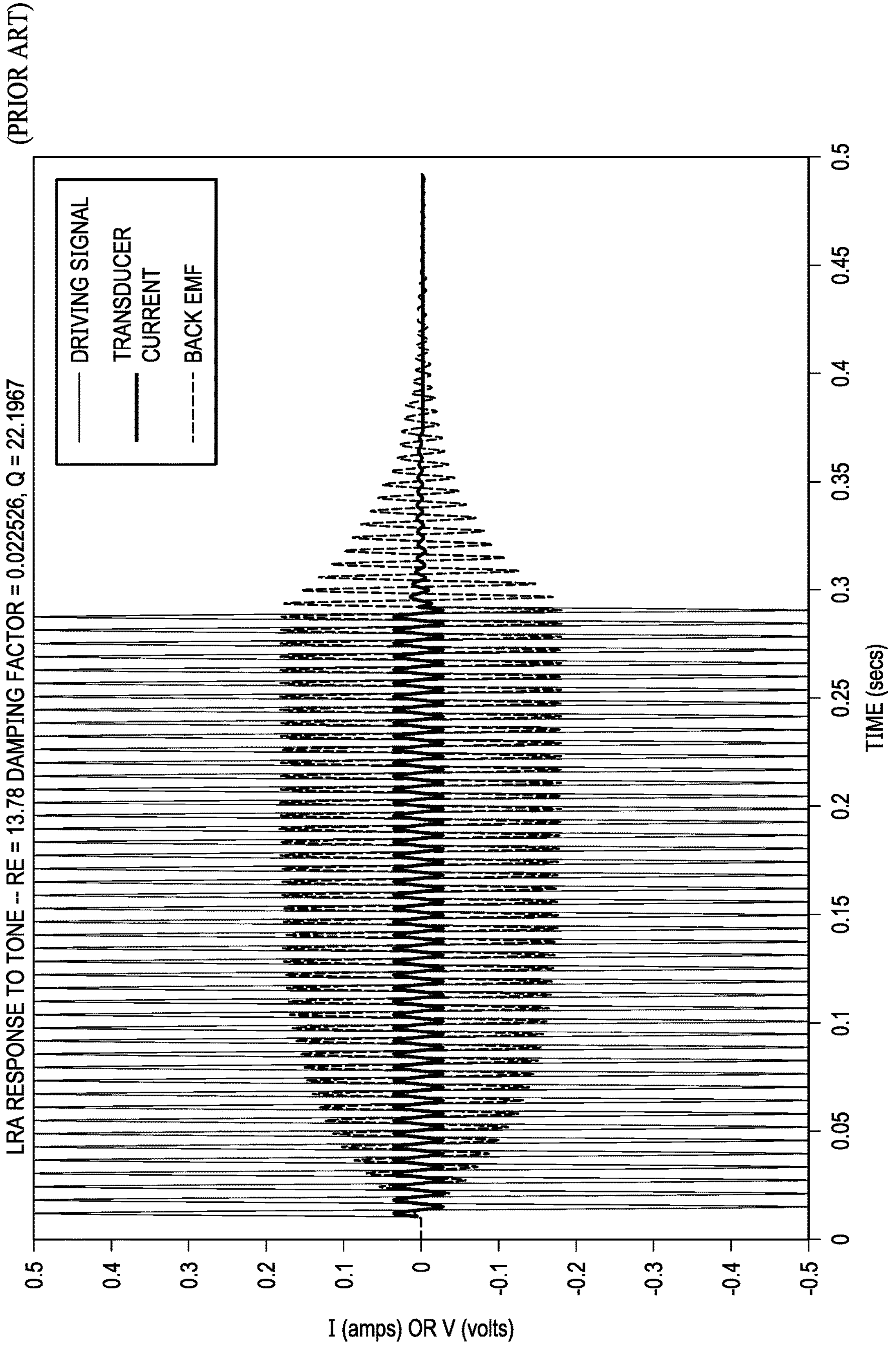
FIG. 3 (PRIOR ART)
FIG. 3 illustrates a graph of example waveforms of an electromagnetic load, as is known in the art.
Figure 4:
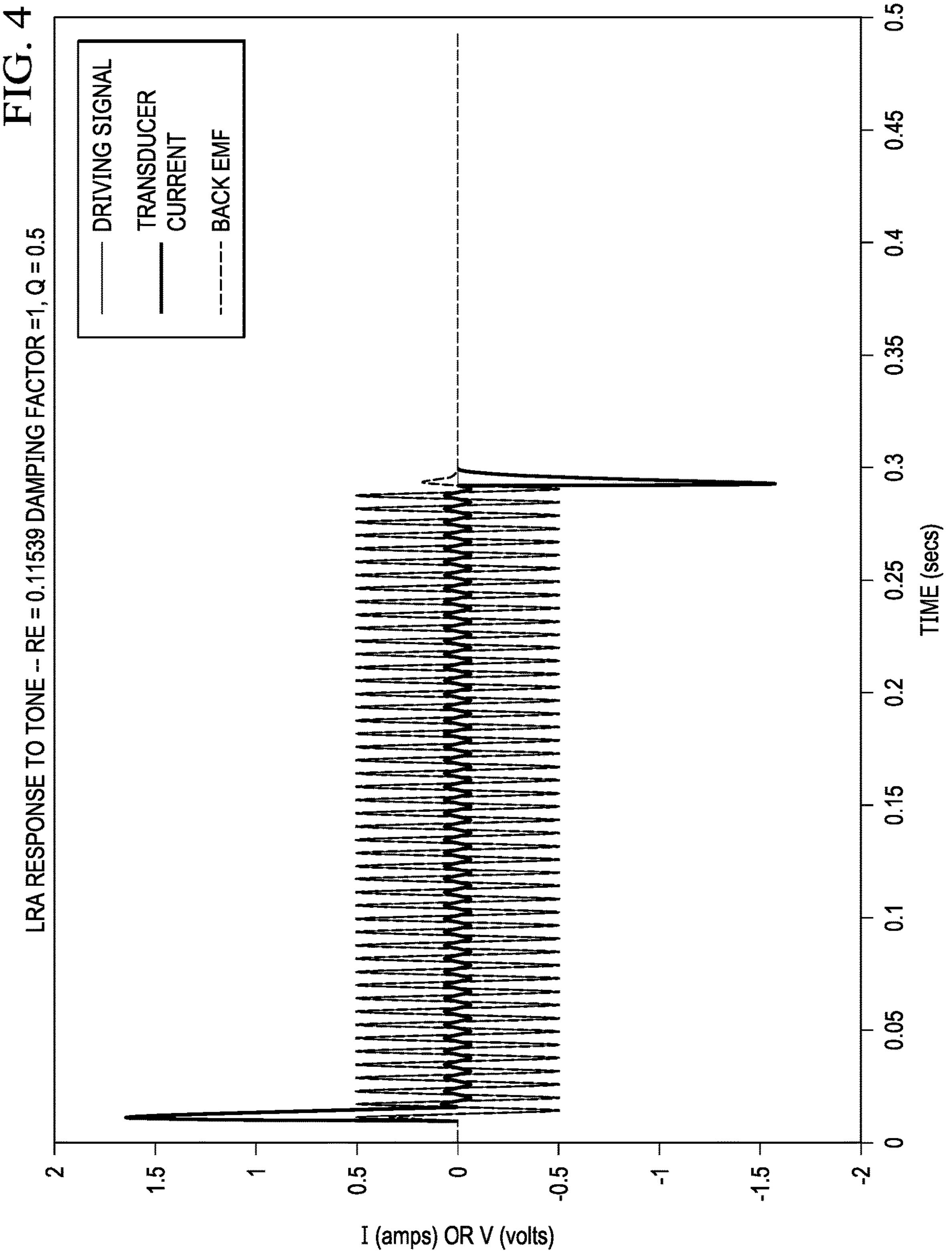
FIG. 4 illustrates a graph of desirable example waveforms of an electromagnetic load, in accordance with embodiments of the present disclosure.

The problem illustrated in FIG. 3 may result from a linear resonant actuator 507 with a high quality factor q with a sharp peak in impedance at a resonant frequency $f_0$ of linear resonant actuator 507.

Figure 7:
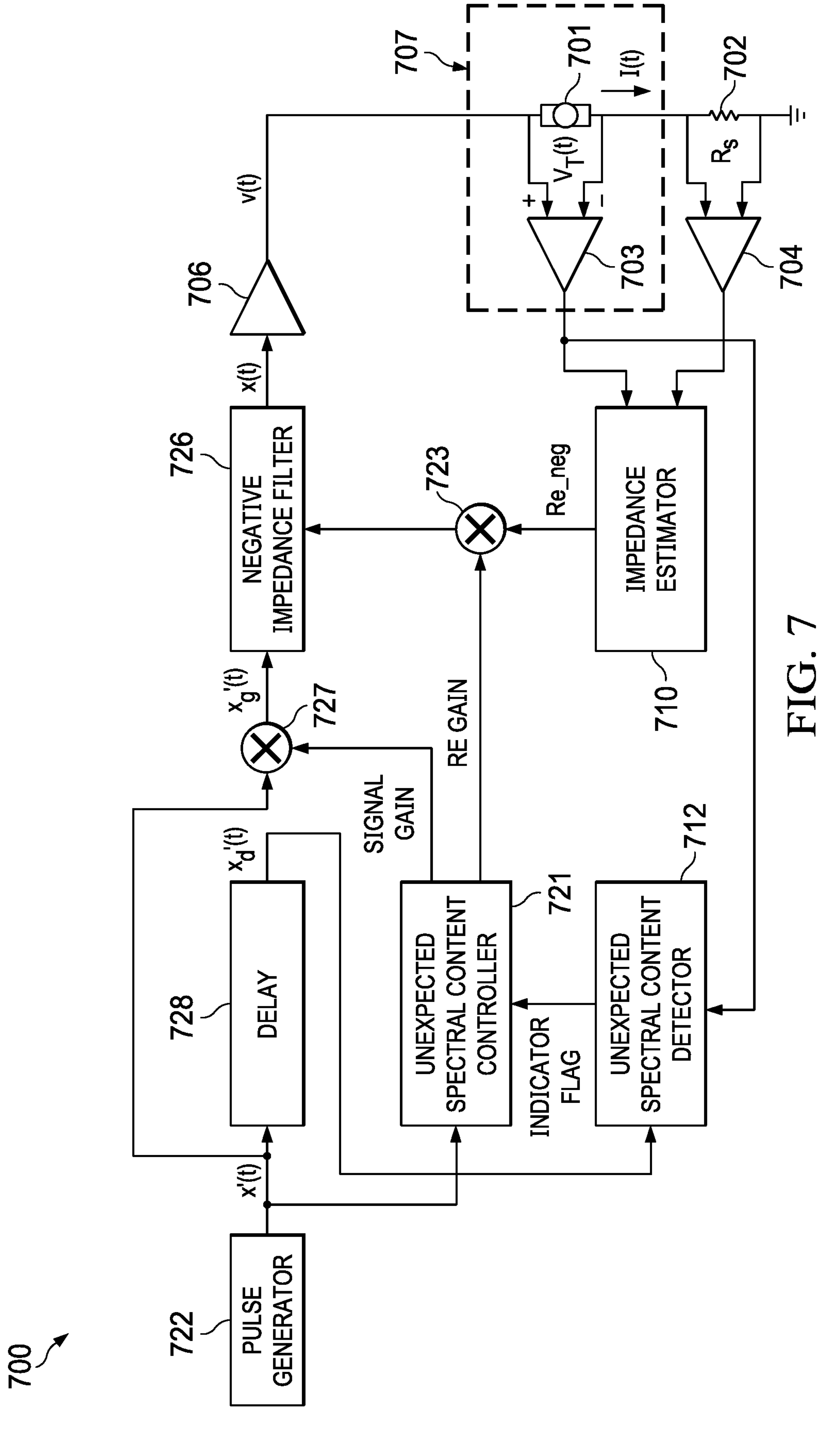
FIG. 7 illustrates an example system for improving transducer dynamics, in accordance with embodiments of the present disclosure.

FIG. 7 illustrates an example transducer driving system 700 for improving dynamics of an electromagnetic load 701, in accordance with embodiments of the present disclosure. In some embodiments, system 700 may be integral to a host device (e.g., host device 502) comprising system 700 and electromagnetic load 701.

In operation, a pulse generator 722 of a system 700 of a host device may generate a raw transducer driving signal x'(t) (which, in some embodiments, may be a waveform signal, such as a haptic waveform signal or audio signal). In some embodiments, raw transducer driving signal x'(t) may be generated based on a desired playback waveform received by pulse generator 722.

Raw transducer driving signal x'(t) may be received by a delay element 728 that may apply a time delay to raw transducer driving signal x'(t) to generate a delayed raw transducer driving signal $x_d'(t)$. The amount of delay applied by delay 728 may be approximately equal to a path delay between raw transducer driving signal x'(t) and sensed terminal voltage $V_T(t)$.

In addition, a gain element 727 may apply a signal gain generated by an unexpected spectral content controller 721 to raw transducer driving signal x'(t) in order to generate gained raw transducer driving signal $x_g'(t)$. Gained raw transducer driving signal $x_g'(t)$ may be received by negative impedance filter 726 which, as described in greater detail below, may be applied to gained raw transducer driving signal $x_g'(t)$ to reduce an effective quality factor q of the electromagnetic load 701, which may in turn decrease attack time and minimize ringing occurring after the raw transducer driving signal has ended, thus generating transducer driving signal x(t) to the output of negative impedance filter 726.

Transducer driving signal x(t) may in turn be amplified by amplifier 706 to generate a driving signal V(t) for driving electromagnetic load 701. Responsive to driving signal V(t), a sensed terminal voltage $V_T(t)$ of electromagnetic load 701 may be converted to a digital representation by a first analog-to-digital converter (ADC) 703. Similarly, sensed current I(t) may be converted to a digital representation by a second ADC 704. Current 1(*t*) may be sensed across a shunt resistor 702 having resistance $R_s$ coupled to a terminal of electromagnetic load 701. The terminal voltage $V_T(t)$ may be sensed by a terminal voltage sensing block 707, for example a voltmeter.

As shown in FIG. 7, system 700 may include an impedance estimator 710. Impedance estimator 710 may include any suitable system, device, or apparatus configured to estimate, based on sensed terminal voltage $V_T(t)$, sensed current I(t), and/or any other measured parameters of electromagnetic load 701, one or more components of the electrical and/or mechanical impedances of electromagnetic load 701, and generate one or more control signals (e.g., a negative impedance Re_neg) for controlling a response of negative impedance filter 726. Examples of approaches for estimating one or more components of the electrical and/or mechanical impedances of electromagnetic load 701 and generating a negative impedance value Re_neg are described in, without limitation, U.S. patent application Ser. No. 16/816,790 filed Mar. 12, 2020 and entitled "Methods and Systems for Improving Transducer Dynamics;" U.S. patent application Ser. No. 16/816,833 filed Mar. 12, 2020 and entitled "Methods and Systems for Estimating Transducer Parameters;" U.S. patent application Ser. No. 16/842,482 filed Apr. 7, 2020 and entitled "Thermal Model of Transducer for Thermal Protection and Resistance Estimation;" and U.S. patent application Ser. No. 16/369,556 filed Mar. 29, 2019 and entitled "Driver Circuitry;" all of which are incorporated by reference herein in their entireties.

As mentioned above and described in greater detail below, a system 700 may implement negative impedance filter 726 to apply to the raw transducer driving signal, which may reduce an effective quality factor q of the transducer, which may in turn decrease attack time and minimize ringing occurring after the raw transducer driving signal has ended. Quality factor q of a transducer may be expressed as:

$$q = \frac{R_{RES} * Re}{R_{RES} + Re} * \sqrt{\frac{C_{MES}}{L_{CES}}} \tag{7}$$

In equation (7), as DC resistance Re increases, the numerator term $R_{RES}$*Re increases more rapidly than the denominator term $R_{RES}$+Re. Therefore, quality factor q generally increases with increasing DC resistance Re. Accordingly, one way system 700 may minimize quality factor q is to effectively decrease DC resistance Re. In some embodiments, system 700 may ideally decrease the effective DC resistance Re to a point in which critical damping occurs in electromagnetic load 701.

Figure 8:
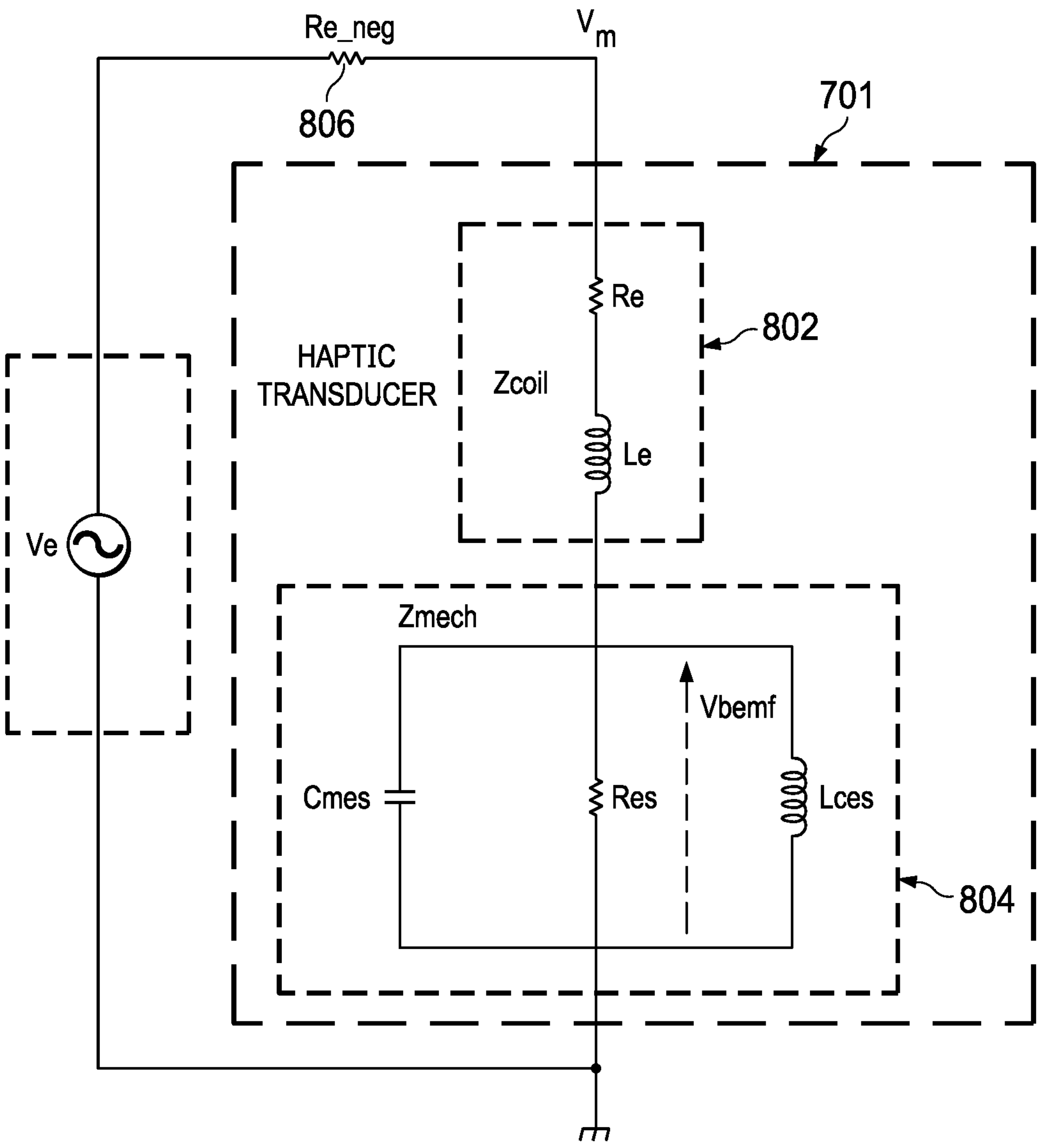
FIG. 8 illustrates an example of a linear resonant actuator (LRA) modelled as a linear system and including a negative resistance, in accordance with embodiments of the present disclosure.

Turning briefly to FIG. 8, FIG. 8 illustrates an example of electromagnetic load 701 modelled as a linear system including electrical components 802 and electrical model of mechanical components 804, and including a negative resistance resistor 806 with negative impedance Re_neg inserted in series with electromagnetic load 701, in accordance with embodiments of the present disclosure. The addition of negative impedance Re_neg may lower quality factor q because effectively it subtracts from DC resistance Re thereby reducing the overall DC electrical impedance.

In practice, negative resistors do not exist. Instead, negative impedance filter 726 may comprise a digital filter configured to behave substantially like the circuit shown in FIG. 8, including a mathematical model of negative impedance Re_neg in series with a mathematical model of electromagnetic load 701. In operation, negative impedance filter 726 may in effect compute a voltage $V_m$ that would occur at the junction of negative impedance Re_neg and DC resistance Re as shown in FIG. 8, if, in fact, it were possible to place a physical resistor with negative impedance Re_neg in series with electromagnetic load 701. Computed voltage $V_m$ may then be used to drive electromagnetic load 701.

In essence, system 700 implements a negative impedance feedback loop for electromagnetic load 701. The feedback loop may use a dynamic estimate of parameters of electromagnetic load 701 and generate feedback (e.g., negative impedance Re_neg and the response of negative impedance filter 726) to cancel most of the electrical and mechanical impedance of electromagnetic load 701. The electrical and mechanical impedance of electromagnetic load 701 may change in response to the stimulus applied to it (e.g., amplitude and frequency of driving signal V(t)), ambient temperature conditions, and/or other factors.

In order for impedance cancellation performed by the feedback loop to be effective, most of the impedance of electromagnetic load 701 should be cancelled (e.g., from 95% to just under 100% of the impedance of electromagnetic load 701). However, when the feedback loop cancels almost all of the impedance of electromagnetic load 701, instability of the feedback loop may result, for example if the impedance to be cancelled is incorrectly estimated. Such instability may result from non-linearity of amplifier 706 that may occur when the feedback loop cancels almost all of the impedance of electromagnetic load 701, thus resulting in unexpected spectral content present in sensed terminal voltage $V_T(t)$.

To balance the effectiveness of reducing quality factor q with prevention of instability in the feedback loop, system 700 may include an unexpected spectral content detector 712 to detect unexpected spectral content present in sensed terminal voltage $V_T(t)$ and, when such unexpected spectral content is detected, generate an unexpected spectral content flag (e.g., labeled as "indicator flag" in FIG. 7) communicated to unexpected spectral content controller 721 such that unexpected spectral content controller 721 may reduce (at least temporarily) the amount of the impedance of electromagnetic load 701 cancelled in order to reduce the presence of unexpected spectral content in order to prevent non-linearity/instability.

Figure 9:
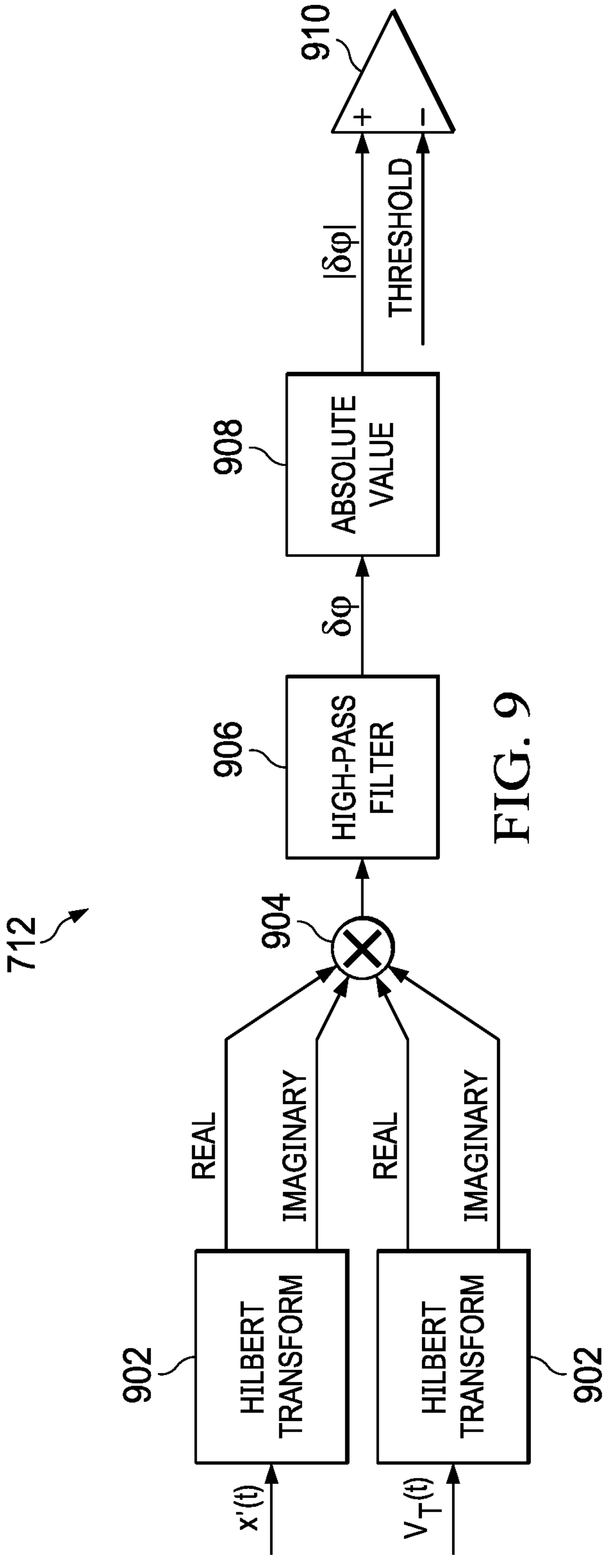
FIG. 9 illustrates a block diagram of selected components of an example unexpected spectral content detector, in accordance with embodiments of the present disclosure.

FIG. 9 illustrates a block diagram of selected components of an example unexpected spectral content detector 712, in accordance with embodiments of the present disclosure. As shown in FIG. 9, unexpected spectral content detector 712 may receive sensed terminal voltage $V_T(t)$ and delayed raw transducer driving signal $x_d'(t)$ and apply a Hilbert transform 902 (or any other suitable transform with similar functionality) to generate analytic signals having both real and imaginary components of sensed terminal voltage $V_T(t)$ and delayed raw transducer driving signal $x_d'(t)$. Conjugate multiplier 904 may conjugate these real and imaginary components to obtain a phase angle that represents a phase angle difference between sensed terminal voltage $V_T(t)$ and delayed raw transducer driving signal $x_d'(t)$. The signal output by conjugate multiplier 904 may be filtered by high-pass filter 906 to remove direct-current components, leaving a phase angle $\Delta\varphi$ representing the phase difference between sensed terminal voltage $V_T(t)$ and delayed raw transducer driving signal $x_d'(t)$. Absolute value block 908 may receive phase angle $\Delta\varphi$ and output phase angle magnitude $|\Delta\varphi|$. A comparator 910 may compare phase angle magnitude $|\Delta\varphi|$ to a threshold value. If phase angle magnitude $|\Delta\varphi|$ exceeds the threshold value, comparator 910 may set an indicator flag to indicate the presence of unexpected spectral content in sensed terminal voltage $V_T$, which may be an early indicator of non-linearity and impending instability of the feedback loop of FIG. 7.

In operation, unexpected spectral content controller 721 may select an impedance gain RE GAIN to be applied to negative impedance Re_neg by a gain element 723 of FIG. 7 and/or select a signal gain SIGNAL GAIN to be applied to raw transducer driving signal x'(t) to generate gained raw transducer driving signal $x_g'(t)$. Thus, in response to the frequency, duration, or pattern of instability flag events being outside desired limits, unexpected spectral content controller 721 may (at least temporarily) reduce impedance gain RE GAIN and/or signal gain SIGNAL GAIN to reduce the likelihood of non-linearity/instability of the feedback loop of the system shown in FIG. 7.

Figure 10:
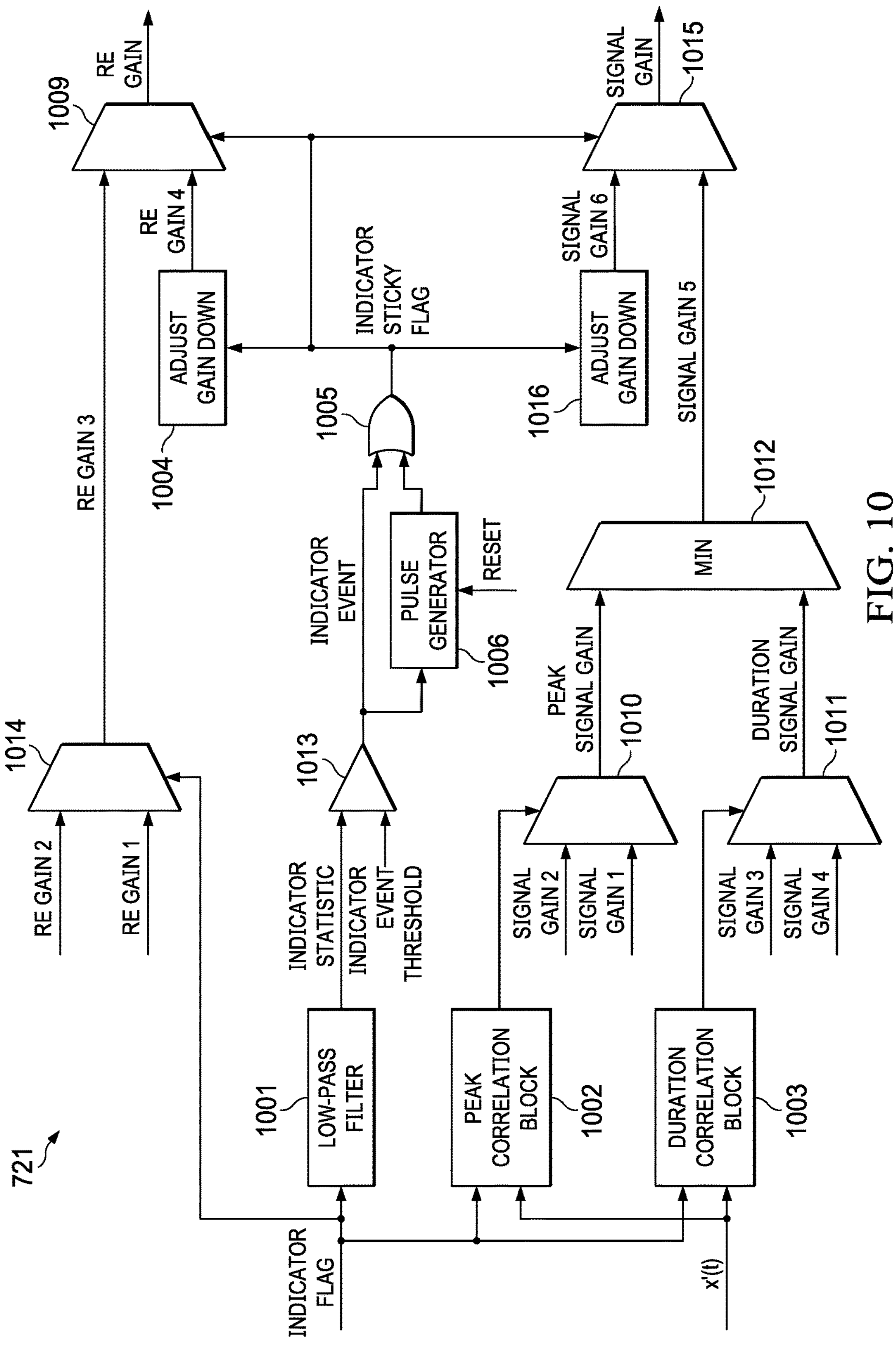
FIG. 10 illustrates a block diagram of selected components of an example unexpected spectral content controller, in accordance with embodiments of the present disclosure.

FIG. 10 illustrates a block diagram of selected components of an example unexpected spectral content controller 721, in accordance with embodiments of the present disclosure.

As shown in FIG. 10, unexpected spectral content controller 721 may include a multiplexer 1014 controlled by the indicator flag generated by unexpected spectral content detector 712 such that, immediately upon the indicator flag being set, multiplexer 1014 may select an impedance gain RE GAIN2 instead of RE GAIN1, wherein RE GAIN2<RE GAIN1, such that the resulting impedance gain RE GAIN3 may immediately reduce impedance gain RE GAIN, thus reducing negative impedance Re_neg used by negative impedance filter 726, as disclosed in U.S. Patent Publication No. 2021/0175869 entitled "Methods and Systems for Detecting and Managing Amplifier Instability," published Jun. 10, 2021 and incorporated by reference herein.

Unexpected spectral content controller 721 may also include a low-pass filter 1001 configured to low-pass filter the indicator flag in order to generate an indicator statistic. A comparator 1013 may compare the indicator statistic to an indicator event threshold. If the indicator statistic is larger than the indicator event threshold, comparator 1013 may assert an indicator event signal which may be communicated to logical OR gate 1005. Thus, when the indicator event signal is asserted, logical OR gate 1005 may assert an indicator sticky flag signal. A multiplexer 1009 may be controlled by the indicator sticky flag signal, such that when the indicator sticky flag signal is asserted, multiplexer 1009 selects an impedance gain RE GAIN 4 lesser than impedance gain RE GAIN 3 to be applied to impedance gain RE GAIN, which may further reduce the negative impedance/resistance Re used by the negative impedance filter 726.

A pulse generator 1006 may also receive the indicator event signal, whose output may also be applied to an input of logical OR gate 1005. The use of pulse generator 1006 may maintain assertion of the indicator sticky flag signal for a period matching the duration of pulse generator 1006. Such duration may be any suitable value of time from zero to infinity. As also shown in FIG. 10, pulse generator 1006 may receive an external reset signal configured to reset pulse generator 1006.

The indicator sticky flag may also be used to further reduce impedance gain RE GAIN used by negative impedance filter 726, by signalling adjust gain down block 1004 to reduce impedance gain RE GAIN and setting mux 1009 to select impedance gain RE GAIN4 as impedance gain RE GAIN. This adjustment by adjust gain down block 1004 may reduce impedance gain RE GAIN by a significant amount for the duration of the pulse of pulse generator 1006.

In some instances, adjust gain down block 1004 may reduce impedance gain RE GAIN to zero if desired, which may effectively disable the negative impedance cancellation for the duration of the pulse of pulse generator 1006.

In a similar manner, the indicator sticky flag may also be used to reduce the signal gain SIGNAL GAIN applied by multiplier 727, by signalling adjust gain down block 1016 to reduce signal gain RE GAIN and setting mux 1015 to select signal gain SIGNAL GAIN6 as signal gain SIGNAL GAIN. This adjustment by adjust gain down block 1016 may reduce SIGNAL gain SIGNAL GAIN by a significant amount for the duration of the pulse of pulse generator 1006.

Additional reliability for the system of FIG. 7 may be achieved by examining the indicator flag for patterns that cause undesirable system behaviour. Peak correlation block 1002 may correlate peaks in raw transducer driving signal x'(t) to events that cause an indicator flag to be set. In response to a high correlation between raw transducer driving signal x'(t) and the indicator flag, peak correlation block 1002 may cause a multiplexer 1010 to select a lower signal gain SIGNAL GAIN2 in lieu of a default signal gain SIGNAL GAIN1. Such alternate gain selection may distort signal peaks but may also protect system hardware from potential damage.

In a similar manner, correlation duration block 1003 may correlate indicator flag events with long duration signals of raw transducer driving signal x'(t) (e.g., that might happen due to overheating with extended use). In response to a large duration correlation between raw transducer driving signal x'(t) and the indicator flag, duration correlation block 1003 may cause a multiplexer 1011 to select a lower signal gain SIGNAL GAIN4 in lieu of a default signal gain SIGNAL GAIN3.

A minimum block 1012 may select the smaller of the selected peak signal gain and selected duration signal gain as a SIGNAL GAIN 5. Multiplexer 1015 may select signal gain SIGNAL GAIN5 under conditions in which the indicator sticky flag is not set, and select signal gain SIGNAL GAIN6 for conditions where an indicator sticky flag is set.

Using the systems and methods described above, unexpected spectral content detector 712 and unexpected spectral content controller 721 may monitor a reaction of the closed-loop system of FIG. 7 to the strength of the control loop controls (e.g., estimated resistances and inductances of electromagnetic load 701). Further, unexpected spectral content detector 712 and unexpected spectral content controller 721 may modify the estimated resistances and inductances of electromagnetic load 701 dynamically based on indicator flag events and/or one or more statistics based on indicator flag events.

In doing so, unexpected spectral content detector 712 and unexpected spectral content controller 721 may accomplish one or more of the following objectives:

1) Keeping track of a local frequency of indicator flag events. A number of indicator flag events exceeding a threshold within a particular duration of time may in effect trigger decrease in negative impedance applied by negative impedance filter 726 to a safe level. Such an event may be referred to as a negative impedance failure.

2) Handling negative impedance failures with varying complexity:

a) Disabling negative impedance feedback, then attempting to return after some time has passed.

b) Testing reduced negative impedance strength to determine if reducing negative impedance feedback gain limits feedback loop instability.

c) Testing reduced signal gain to determine if reducing signal gain limits feedback loop instability.

d) Examining unexpected spectral content for patterns that may aid in identifying physical damage to electromagnetic load 701 and/or other hardware components.

e) Modifying a playback signal and feedback to avoid further system damage.

Although the foregoing contemplates instability control by controlling a gain applied to negative impedance Re_neg, in some embodiments, unexpected spectral content detector 712 may control other parameters in order to maintain feedback loop stability. For example, in addition to or in lieu of controlling a gain applied to negative impedance Re_neg, in some embodiments, unexpected spectral content detector 712 and/or unexpected system content controller 721 may control a response of negative impedance filter 726, operational parameters of amplifier 706, and/or any other parameters of system 700.

In summary, methods and systems for detecting and managing unexpected spectral content in an amplifier system are provided. One example method may involve a transducer driving system receiving a first signal for driving an amplifier that drives an electromagnetic load. The transducer driving system may receive a second signal driven by the amplifier. The method may further include detecting unexpected spectral content in the feedback control loop and declaring an indicator event based on the detected unexpected spectral content. The method may also include determining whether the indicator event occurs in an undesired pattern. In response to the indicator event occurring in the undesired pattern, a system behavior of the transducer driving system may be modified.

The modified system behavior may disable a negative impedance of the feedback loop until the negative impedance is re-enabled from a higher level control. The modified system behavior may disable a negative impedance of the feedback loop for some amount of time which is a function of the undesired pattern. The impedance modification may be for a fixed time. The impedance modification may be modified for a dynamic time, depending on the history of the instability events. The modified system behavior may tune a gain of a negative impedance of the feedback loop. The modified system behavior may tune a signal gain of the first signal. The gain may be reduced to limit frequency of occurrence of instability events. The gain may be reduced to limit frequency of occurrence of instability events.

Another example method may include a transducer driving system receiving a first signal for driving an amplifier that drives an electromagnetic load and further receiving a second signal driven by the amplifier. The method may further include detecting unexpected spectral content in the feedback control loop and modifying behavior of the transducer driving system based on detection of the unexpected spectral content. Such modification may be accomplished by monitoring the unexpected spectral content and the second signal for patterns that identify a physical damage of the electromagnetic load and modifying a signal gain to protect the transducer driving system.

The monitored pattern may be used to identify a correlation between indicator events and signal peaks. The signal gain may be dynamically modified to reduce the signal peaks. In addition or alternatively, the monitored pattern may be used to look for correlation between indicator events and signal duration. The signal gain may be dynamically modified to reduce signal strength for long duration signals.

Although the foregoing discusses application to a linear electromagnetic load, it is understood that systems and methods similar or identical to those disclosed may be applied to other linear or non-linear systems.

Further, although the foregoing contemplates use of a negative resistance filter to implement a model of an LRA, in some embodiments a mathematical equivalent to an LRA may be used in lieu of a model.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:

receiving, by a transducer driving system, a first signal for driving an amplifier that drives an electromagnetic load;

receiving, by the transducer driving system, a second signal driven by the amplifier in order to control a feedback loop of the transducer driving system;

detecting unexpected spectral content in the second signal;

declaring an indicator event based on the detected unexpected spectral content;

determining whether the indicator event occurs in an undesired pattern;

in response to the indicator event occurring in the undesired pattern, modifying a behavior of the transducer driving system.

2. The method of claim 1, wherein modifying the behavior of the transducer driving system comprises modifying a negative impedance of the feedback loop.

3. The method of claim 1, wherein modifying the behavior of the transducer driving system comprises modifying the negative impedance of the feedback loop for a duration of time which is a function of the undesired pattern.

4. The method of claim 3, wherein the negative impedance is modified for a fixed period of time.

5. The method of claim 3, wherein the negative impedance is modified for a dynamically-adjustable time which is a function of a history of indicator events.

6. The method of claim 1, wherein modifying the behavior of the transducer driving system comprises tuning a gain of a negative impedance of the feedback loop.

7. The method of claim 6, further comprising reducing the gain of the negative impedance to limit frequency of occurrence of indicator events.

8. The method of claim 1, wherein modifying the behavior of the transducer driving system comprises modifying a signal gain of the first signal.

9. The method of claim 8, further comprising reducing the signal gain to limit frequency of occurrence of instability events.

10. A method comprising:

receiving, by a transducer driving system, a first signal for driving an amplifier that drives an electromagnetic load;

receiving, by the transducer driving system, a second signal driven by the amplifier in order to control a feedback loop of the transducer driving system;

detecting unexpected spectral content in the second signal;

in response to detecting the unexpected spectral content, modifying a system behavior of the transducer driving system by:

monitoring the unexpected spectral content and the second signal for patterns that identify a physical damage of the electromagnetic load; and modifying a signal gain applied to the first signal to protect the transducer driving system.

11. The method of claim 10, wherein the patterns comprise a correlation between unexpected spectral content events and signal peaks of the second signal and the method further comprises dynamically modifying the signal gain to reduce the signal peaks.

12. The method of claim 10, wherein the patterns comprise a correlation between instability events and a signal duration of the second signal; and the method further comprises dynamically modifying the signal gain to reduce signal strength for long-duration signals.

13. A transducer driving system, comprising:

a driver output for driving an amplifier that drives an electromagnetic load;

a feedback input for receiving a signal driven by the amplifier in order to control a feedback loop of the transducer driving system; and an unexpected spectral content detector and controller subsystem configured to:

detect unexpected spectral content in the signal;

declare an indicator event based on the detected unexpected spectral content;

determine whether the indicator event occurs in an undesired pattern; and in response to the indicator event occurring in the undesired pattern, modify a behavior of the transducer driving system.

14. The transducer driving system of claim 13, wherein modifying the behavior of the transducer driving system comprises modifying a negative impedance of the feedback loop.

15. The transducer driving system of claim 14, wherein modifying the behavior of the transducer driving system comprises modifying the negative impedance of the feedback loop for a duration of time which is a function of the undesired pattern.

16. The transducer driving system of claim 15, wherein the negative impedance is modified for a fixed period of time.

17. The transducer driving system of claim 15, wherein the negative impedance is modified for a dynamically-adjustable time which is a function of a history of indicator events.

18. The transducer driving system of claim 13, wherein modifying the behavior of the transducer driving system comprises tuning a gain of a negative impedance of the feedback loop.

19. The transducer driving system of claim 18, wherein the unexpected spectral content detector and controller subsystem is further configured to reduce the gain of the negative impedance to limit frequency of occurrence of indicator events.

20. The transducer driving system of claim 13, wherein modifying the behavior of the transducer driving system comprises modifying a signal gain of a first signal.

21. The transducer driving system of claim 20, wherein the unexpected spectral content detector and controller subsystem is further configured to reduce the signal gain to limit frequency of occurrence of instability events.

22. A transducer driving system comprising:

a driver output for driving an amplifier that drives an electromagnetic load;

a feedback input for receiving a first signal driven by the amplifier in order to control a feedback loop of the transducer driving system; and an unexpected spectral content detector and controller subsystem configured to:

detect unexpected spectral content in the signal; and in response to detecting the unexpected spectral content, modify a system behavior of the transducer driving system by:

monitoring the unexpected spectral content and a second signal for patterns that identify a physical damage of the electromagnetic load; and modifying a signal gain applied to the first signal to protect the transducer driving system.

23. The transducer driving system of claim 22, wherein the patterns comprise a correlation between unexpected spectral content events and signal peaks of the second signal and the method further comprises dynamically modifying the signal gain to reduce the signal peaks.

24. The transducer driving system of claim 22, wherein the patterns comprise a correlation between instability events and a signal duration of the second signal; and the method further comprises dynamically modifying the signal gain to reduce signal strength for long-duration signals.

* * * * *